(12) United States Patent
Watanabe (10) Patent No.: US 8,905,863 B2
(45) Date of Patent: Dec. 9, 2014

(54) MULTI-PIECE SOLID GOLF BALL

(75) Inventor: Hideo Watanabe, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 324 days.

(21) Appl. No.: 13/548,648

(22) Filed: Jul. 13, 2012

(65) Prior Publication Data

US 2014/0018189 A1    Jan. 16, 2014

(51) Int. Cl.
*A63B 37/04* (2006.01)
*A63B 37/12* (2006.01)

(52) U.S. Cl.
USPC .......................................... 473/376; 473/378

(58) Field of Classification Search
USPC .................................. 473/351–378
See application file for complete search history.

(56) References Cited

U.S. PATENT DOCUMENTS

| | | | |
|---|---|---|---|
| 5,306,760 A | 4/1994 | Sullivan | |
| 5,312,857 A | 5/1994 | Sullivan | |
| 6,071,201 A | 6/2000 | Maruko | |
| 6,194,505 B1 | 2/2001 | Sone et al. | |
| 6,213,895 B1* | 4/2001 | Sullivan et al. | 473/374 |
| 6,254,495 B1 | 7/2001 | Nakamura et al. | |
| 6,271,296 B1 | 8/2001 | Nakamura et al. | |
| 6,394,912 B1 | 5/2002 | Nakamura et al. | |
| 6,431,998 B1 | 8/2002 | Nakamura et al. | |
| 6,494,795 B2* | 12/2002 | Sullivan | 473/372 |
| 6,605,009 B1 | 8/2003 | Nakamura et al. | |
| 6,642,314 B2 | 11/2003 | Sone et al. | |
| 6,688,991 B2 | 2/2004 | Sullivan et al. | |
| 6,756,436 B2* | 6/2004 | Rajagopalan et al. | 524/322 |
| 6,824,477 B2* | 11/2004 | Rajagopalan et al. | 473/377 |
| 6,894,098 B2 | 5/2005 | Rajagopalan et al. | |
| 6,939,907 B2 | 9/2005 | Rajagopalan et al. | |
| 6,962,539 B2 | 11/2005 | Sullivan et al. | |
| 6,988,962 B2 | 1/2006 | Sullivan et al. | |
| 6,994,638 B2* | 2/2006 | Rajagopalan et al. | 473/377 |
| 7,041,009 B2 | 5/2006 | Sullivan et al. | |
| 7,125,348 B2 | 10/2006 | Sullivan et al. | |
| 7,157,512 B2 | 1/2007 | Rajagopalan et al. | |
| 7,230,045 B2 | 6/2007 | Rajagopalan et al. | |
| 7,285,059 B2 | 10/2007 | Sullivan et al. | |
| 7,294,680 B2 | 11/2007 | Sone et al. | |
| 7,331,878 B2* | 2/2008 | Boehm et al. | 473/376 |
| 7,641,571 B2 | 1/2010 | Hebert et al. | |
| 7,652,086 B2 | 1/2010 | Sullivan et al. | |

(Continued)

FOREIGN PATENT DOCUMENTS

JP    11-035633 A    2/1999
JP    11-164912 A    6/1999

(Continued)

*Primary Examiner* — Alvin Hunter
(74) *Attorney, Agent, or Firm* — Sughrue Mion, PLLC (57) ABSTRACT

A multi-piece solid golf ball having a core, an envelope layer, an intermediate layer and a cover. The core is formed primarily of a thermoplastic resin and has a diameter of from 20 to 30 mm, the envelope layer is formed of a rubber composition containing primarily a rubber material and has a thickness of from 3 to 10 mm, the intermediate layer is formed of a resin composition containing primarily an ionomer, and the cover is formed of a resin composition containing primarily a urethane. Both the relationship among the specific gravities of the core, the envelope layer and the intermediate layer, and the relationship among the surface hardnesses of the core, the envelope layer, the intermediate layer and the cover are optimized.

5 Claims, 1 Drawing Sheet

(56) References Cited

U.S. PATENT DOCUMENTS

| | | | |
|---|---|---|---|
| 7,753,810 B2 * | 7/2010 | Sullivan et al. | 473/376 |
| 7,762,910 B2 * | 7/2010 | Sullivan et al. | 473/376 |
| 7,833,113 B2 * | 11/2010 | Sullivan et al. | 473/376 |
| 7,867,107 B2 * | 1/2011 | Sullivan et al. | 473/376 |
| 7,942,761 B2 * | 5/2011 | Sullivan et al. | 473/376 |
| 7,946,934 B2 * | 5/2011 | Sullivan et al. | 473/376 |
| 7,980,965 B2 * | 7/2011 | Sullivan et al. | 473/376 |
| 8,231,482 B2 * | 7/2012 | Sullivan et al. | 473/376 |
| 8,469,836 B2 * | 6/2013 | Sullivan et al. | 473/376 |
| 8,690,713 B2 * | 4/2014 | Sullivan et al. | 473/376 |
| 2012/0043686 A1 | 2/2012 | Ichikawa et al. | |
| 2012/0046127 A1 | 2/2012 | Ichikawa et al. | |

FOREIGN PATENT DOCUMENTS

| | | |
|---|---|---|
| JP | 2002-293996 A | 10/2002 |
| JP | 2012-040376 A | 3/2012 |
| JP | 2012-045382 A | 3/2012 |
| WO | 98/46671 A1 | 10/1998 |

* cited by examiner

MULTI-PIECE SOLID GOLF BALL

BACKGROUND OF THE INVENTION

The present invention relates to a multi-piece solid golf ball composed of a core, an envelope layer, an intermediate layer and a cover that have been formed as successive layers. More specifically, the invention relates to a golf ball which has both a flight performance and a controllability capable of better satisfying professional golfers and skilled amateur golfers, and which also provides the utmost in "feel" on full shots.

Efforts have hitherto been made to provide golf balls with a multilayer structure so as to increase the distance traveled by the ball and enhance the feel of the ball at impact. In order to lower the spin rate, increase the initial velocity and further improve the feel at impact, various golf balls with multilayer structures of three or more layers have subsequently been described as well.

Golf balls having a somewhat soft cover, an intermediate layer formed of an ionomer material that is relatively hard compared with the cover, and a solid core of a one- or two-layer construction that is formed of rubber material are currently in wide use among professional golfers and skilled amateur golfers as balls endowed with both an excellent flight performance and excellent controllability. Such balls exhibit a high controllability in the short game because of the somewhat soft cover. In addition, owing to the combination of this cover with, on the inside thereof, a hard, high-resilience layer made of an ionomer material, these balls also suppress excessive spin and exhibit a high rebound on full shots with a driver.

Various balls of this type have hitherto been disclosed in, for example, U.S. Pat. Nos. 6,071,201, 6,254,495, 6,271,296, 6,394,912, 6,431,998, 6,605,009, 6,688,991, 6,756,436, 6,824,477, 6,894,098, 6,939,907, 6,962,539, 6,988,962, 7,041,009, 7,125,348, 7,157,512, 7,230,045, 7,285,059, 7,641,571 and 7,652,086, JP-A 2012-40376 and JP-A 2012-45382.

In this way, there exists among professional golfers and skilled amateurs a strong demand for golf balls which enable such golfers to achieve a performance in keeping with their own level of skill. Hence, developing a golf ball endowed with a flight performance, controllability and feel capable of satisfying larger numbers of golfers is important for expanding the golfer base.

SUMMARY OF THE INVENTION

It is therefore an object of the invention to provide a multi-piece solid golf ball which, as a golf ball for professional golfers and skilled amateur golfers, achieves in particular an increased distance on full shots with a driver (W#1) and an improved controllability in the short game, and which moreover is endowed with a good feel on full shots.

As a result of extensive investigations aimed at achieving the above objects, the inventor has discovered that, in a golf ball which includes, in order from the inside: a solid core, an envelope layer, an intermediate layer and a cover, by forming the solid core of a thermoplastic resin having a high resilience and a small specific gravity, there can be obtained a high initial velocity on actual shots and a solid feel; by forming the envelope layer of a rubber material that has a high resilience and is harder than the solid core, it is possible to obtain a high initial velocity and to suppress excess spin receptivity on full shots; by forming the intermediate layer of an ionomer resin that is harder than the envelope layer, the spin rate on full shots can be suppressed; and moreover by forming the outermost cover layer of soft urethane rubber, a high spin performance on approach shots in the short game and an excellent scuff resistance can be achieved.

Accordingly, the invention provides the following multi-piece solid golf ball.

[1] A multi-piece solid golf ball comprising a core, an envelope layer encasing the core, an intermediate layer encasing the envelope layer, and a cover which encases the intermediate layer and has formed on a surface thereof a plurality of dimples, wherein the core is formed primarily of a thermoplastic resin and has a diameter of from 20 to 30 mm, the envelope layer is formed of a rubber composition containing primarily a rubber material and has a thickness of from 3 to 10 mm, the intermediate layer is formed of a resin composition containing primarily an ionomer, and the cover is formed of a resin composition containing primarily a urethane; wherein the intermediate layer has a specific gravity of less than 1.0, and the core, the envelope layer and the intermediate layer have specific gravities which satisfy the condition:

> core specific gravity<envelope layer specific gravity>intermediate layer specific gravity;

and wherein the core, the envelope layer, the intermediate layer and the cover have Shore D surface hardnesses which satisfy the condition:

> core surface hardness<envelope layer surface hardness<intermediate layer surface hardness>cover surface hardness.

[2] The multi-piece solid golf ball of [1], wherein the core diameter is from 22 to 28 mm.

[3] The multi-piece solid golf ball of [1], wherein the envelope layer thickness is from 4 to 8 mm.

[4] The multi-piece solid golf ball of claim 1, wherein the core, the envelope layer, the intermediate layer and the cover have Shore D surface hardnesses which satisfy the conditions:

> 1≤envelope layer surface hardness−core surface hardness≤10
>
> 5≤intermediate layer surface hardness−envelope layer surface hardness≤25
>
> −25 ≤ball surface hardness−intermediate layer surface hardness≤−1.

[5] The multi-piece solid golf ball of [1], wherein the core has a specific gravity of less than 1.0.

BRIEF DESCRIPTION OF THE DIAGRAMS

DETAILED DESCRIPTION OF THE INVENTION

Figure 1:
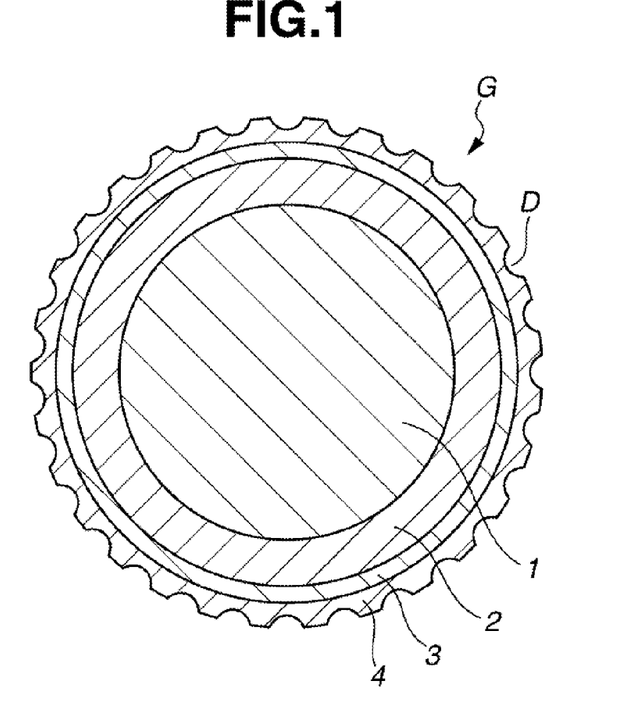
FIG. 1 is a schematic sectional view showing a multi-piece solid golf ball according to the invention.

The invention is described more fully below. First, FIG. 1 shows the cross-sectional structure of the multi-piece solid golf ball of the invention. The golf ball G shown here has a four-layer construction which includes a core 1, an envelope layer 2 encasing the core, an intermediate layer 3 encasing the envelope layer, and a cover 4 encasing the intermediate layer. A plurality of dimples D are typically formed on the surface of the cover 4. Each of these layers is described in detail below.

First, the solid core (sometimes referred to below as simply "the core") is described.

It is critical to set the core diameter to from 20 to 30 mm. The lower limit in the core diameter may be set to more preferably at least 22 mm, and even more preferably at least 24 mm. The upper limit in the core diameter may be set to more preferably 28 mm or less, and even more preferably 26 mm or less. If the core diameter is too small, the spin rate on full shots may become too high, as a result of which a good distance may not be achieved. On the other hand, if the diameter is too large, the durability of the ball to repeated impact may worsen, the feel at impact may become too hard, and the ball rebound may be inadequate, as a result of which a good distance may not be achieved.

The core has a center hardness which, although not subject to any particular limitation, may be set to a Shore D hardness of preferably at least 30, more preferably at least 40, and even more preferably at least 43. There is no particular upper limit in the center hardness of the core, although the Shore D hardness may be set to not more than 65, preferably not more than 55, and even more preferably not more than 50. If the center hardness is too low, the rebound may be too small, as a result of which an increased distance may not be achieved, the feel at impact may be too soft, and the durability of the ball to cracking under repeated impact may worsen. On the other hand, at a center hardness which is too high, the spin rate may rise excessively, as a result of which an increased distance may not be achieved and the feel at impact may be too hard.

The core has a surface hardness which, although not subject to any particular limitation, may be set to a Shore D hardness value of preferably at least 36, more preferably at least 46, and even more preferably at least 49. There is no particular upper limit in the surface hardness of the core, although the Shore D hardness may be set to preferably not more than 71, more preferably not more than 61, and even more preferably not more than 56. If the surface hardness is too low, the rebound may become too small, as a result of which a good distance may not be achieved, the feel at impact may be too soft, and the durability of the ball to cracking under repeated impact may worsen. On the other hand, at a surface hardness which is too high, the feel at impact may become too hard and the durability to cracking on repeated impact may worsen.

Here, "center hardness" refers to the hardness measured at the center of the cross-section obtained by cutting the core in half (through the center), and "surface hardness" refers to the hardness measured on the surface of the core (spherical surface). Also, "Shore D hardness" refers to the hardness measured using a type D durometer in general accordance with ASTM D2240-95.

The core has a deflection, when compressed under a final load of 1,275 N (130 kgf) from an initial load of 98 N (10 kgf), which, although not subject to any particular limitation, may be set to preferably at least 2 mm, more preferably at least 2.6 mm, and even more preferably at least 3.0 mm. There is no particular upper limit, although the deflection may be set to preferably not more than 10 mm, more preferably not more than 8.0 mm, and even more preferably not more than 5.0 mm. If the deflection is too large (that is, if the core is too soft), the ball rebound may be small, as a result of which a good distance may not be achieved, the feel of the ball at impact may be too soft, and the durability to cracking on repeated impact may worsen. On the other hand, if the deflection is too small (that is, if the core is too hard), the spin rate may rise excessively, as a result of which a good distance may not be achieved, and the feel at impact may be too hard.

The solid core is formed using a thermoplastic resin. In the present invention, although not subject to any particular limitation, particularly from the standpoint of obtaining a high rebound and an excellent flight performance, it is preferable to form the solid core using a thermoplastic resin composition which is a mixture obtained by blending as essential components:

100 parts by weight of a resin component composed of, in admixture,
a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and
(e) a non-ionomeric thermoplastic elastomer in a weight ratio between 100:0 and 50:50;
(c) from 5 to 80 parts by weight of a fatty acid and/or fatty acid derivative having a molecular weight of from 228 to 1500; and
(d) from 0.1 to 17 parts by weight of a basic inorganic metal compound capable of neutralizing un-neutralized acid groups in the base resin and component (c).

Above components (a) to (e) are described in detail below.

The olefin in the above base resin, whether in component (a) or component (b), has a number of carbons which is generally at least 2 but not more than 8, and preferably not more than 6. Specific examples include ethylene, propylene, butene, pentene, hexene, heptene and octene. Ethylene is especially preferred.

Examples of unsaturated carboxylic acids include acrylic acid, methacrylic acid, maleic acid and fumaric acid. Acrylic acid and methacrylic acid are especially preferred.

Moreover, the unsaturated carboxylic acid ester is preferably a lower alkyl ester of the above unsaturated carboxylic acid. Specific examples include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) is especially preferred.

The olefin-unsaturated carboxylic acid random copolymer of component (a) and the olefin-unsaturated carboxylic acid-unsaturated carboxylic acid ester random terpolymer of component (b) (the copolymers in components (a) and (b) are referred to collectively below as "random copolymers") can each be obtained by random copolymerization of the above components using a known method.

It is recommended that the above random copolymers have unsaturated carboxylic acid contents (acid contents) which are regulated. Here, the content of unsaturated carboxylic acid present in the random copolymer serving as component (a), although not subject to any particular limitation, may be set to preferably at least 4 wt %, more preferably at least 6 wt %, even more preferably at least 8 wt %, and most preferably at least 10 wt %. Although there is no upper limit, it is recommended that this content be preferably not more than 30 wt %, more preferably not more than 20 wt %, even more preferably not more than 18 wt %, and most preferably not more than 15 wt %.

Similarly, the content of unsaturated carboxylic acid present in the random copolymer serving as component (b), although not subject to any particular limitation, may be set to preferably at least 4 wt %, more preferably at least 6 wt %, and even more preferably at least 8 wt %. Although there is no particular upper limit, it is recommended that this content be preferably not more than 15 wt %, more preferably not more than 12 wt %, and even more preferably not more than 10 wt %. If the acid content of the random copolymer is too low, the resilience may decrease, whereas if it is too high, the processability may decrease.

The metal ion neutralization products of the random copolymers of components (a) and (b) may be obtained by neutralizing some of the acid groups on the random copolymer with metal ions. Here, specific examples of metal ions for neutralizing the acid groups include $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. Of these, preferred use can be made of, for example, $Na^+$, $Li^+$, $Zn^{++}$ and $Mg^{++}$. From the standpoint of improving resilience, the use of $Na^+$ is recommended. The degree of neutralization of the random copolymer by these metal ions is not subject to any particular limitation. Such neutralization products may be obtained by a known method. For example, use may be made of a method in which neutralization is carried out with a compound such as a formate, acetate, nitrate, carbonate, bicarbonate, oxide, hydroxide or alkoxide of the above-mentioned metal ions.

Sodium ion-neutralized ionomer resins may be suitably used as the above metal ion neutralization products of the random copolymers to increase the melt flow rate (MFR) of the material. In this way, adjustment of the material to the subsequently described optimal melt flow rate is easy, enabling the moldability to be improved.

Commercially available products may be used as above components (a) and (b). Illustrative examples of the random copolymer in component (a) include Nucrel N1560, Nucrel N1214, Nucrel N1035 and Nucrel AN4221C (all products of DuPont-Mitsui Polychemicals Co., Ltd.), and Escor 5200, Escor 5100 and Escor 5000 (all products of ExxonMobil Chemical). Illustrative examples of the random copolymer in component (b) include Nucrel AN4311, Nucrel AN4318 and Nucrel AN4319 (all products of DuPont-Mitsui Polychemicals Co., Ltd.), and Escor ATX325, Escor ATX320 and Escor ATX310 (all products of ExxonMobil Chemical).

Illustrative examples of the metal ion neutralization product of the random copolymer in component (a) include Himilan 1554, Himilan 1557, Himilan 1601, Himilan 1605, Himilan 1706 and Himilan AM7311 (all products of DuPont-Mitsui Polychemicals Co., Ltd.), Surlyn 7930 (E.I. DuPont de Nemours & Co.), and Iotek 3110 and Iotek 4200 (both products of ExxonMobil Chemical). Illustrative examples of the metal ion neutralization product of the random copolymer in component (b) include Himilan 1855, Himilan 1856 and Himilan AM7316 (all products of DuPont-Mitsui Polychemicals Co., Ltd.), Surlyn 6320, Surlyn 8320, Surlyn 9320 and Surlyn 8120 (all products of E.I. DuPont de Nemours & Co.), and Iotek 7510 and Iotek 7520 (both products of ExxonMobil Chemical). Sodium-neutralized ionomer resins that are suitable as the metal ion neutralization product of the random copolymer include Himilan 1605, Himilan 1601 and Himilan 1555.

When preparing the above-described base resin, component (a) and component (b) are admixed in a weight ratio of generally between 100:0 and 0:100, preferably between 100:0 and 25:75, more preferably between 100:0 and 50:50, even more preferably between 100:0 and 75:25, and most preferably 100:0. If too little component (a) is included, the molded material obtained therefrom may have a decreased resilience.

The processability of the base resin can be further improved by, in addition to adjusting the above mixing ratio, also adjusting the mixing ratio between the random copolymers and the metal ion neutralization products of the random copolymers. In this case, it is recommended that the weight ratio of the random copolymers to the metal ion neutralization products of the random copolymers be set to generally between 0:100 and 60:40, preferably between 0:100 and 40:60, more preferably between 0:100 and 20:80, and even more preferably 0:100. The addition of too much random copolymer may lower the uniformity of the pellet composition.

A non-ionomeric thermoplastic elastomer (e) may be included in the base resin so as to enhance even further both the feel of the ball at impact and the rebound. Examples of this component (e) include olefin elastomers, styrene elastomers, polyester elastomers, urethane elastomers and polyamide elastomers. In this invention, to further increase the rebound, it is preferable to use a polyester elastomer or an olefin elastomer. The use of an olefin elastomer composed of a thermoplastic block copolymer which includes crystalline polyethylene blocks as the hard segments is especially preferred.

A commercially available product may be used as component (e). Illustrative examples include Dynaron (JSR Corporation) and the polyester elastomer Hytrel (DuPont-Toray Co., Ltd.).

The amount of component (e) included, although not subject to any particular limitation, may be set such that the weight ratio of the base resin to component (e), or base resin/component (e), is between 100:0 and 50:50. Too much component (e) may lower the compatibility of the mixture, which may result in a substantial decline in the durability of the golf ball.

Next, a fatty acid or fatty acid derivative having a molecular weight of at least 228 but not more than 1500 may be added as component (c) to the base resin. Compared with the base resin, this component (c) has a very low molecular weight and, by suitably adjusting the melt viscosity of the mixture, helps in particular to improve the flow properties. Moreover, component (c) includes a relatively high content of acid groups (or derivatives thereof), and is capable of suppressing an excessive loss of resilience.

The molecular weight of the fatty acid or fatty acid derivative of component (c) may be set to at least 228, preferably at least 256, more preferably at least 280, and even more preferably at least 300. The upper limit may be set to not more than 1500, preferably not more than 1000, more preferably not more than 600, and even more preferably not more than 500. If the molecular weight is too low, it may not be possible to improve the heat resistance. On the other hand, if the molecular weight is too high, it may not be possible to improve the flow properties.

Preferred use as the fatty acid or fatty acid derivative of component (c) may likewise be made of, for example, an unsaturated fatty acid (or derivative thereof) containing a double bond or triple bond on the alkyl moiety, or a saturated fatty acid (or derivative thereof) in which the bonds on the alkyl moiety are all single bonds. In either case, it is recommended that the number of carbons on the molecule be preferably at least 18, more preferably at least 20, even more preferably at least 22, and most preferably at least 24. It is recommended that the upper limit be preferably not more than 80, more preferably not more than 60, even more preferably not more than 40, and most preferably not more than 30. Too few carbons may make it impossible to improve the heat resistance and may also make the acid group content so high as to diminish the flow-improving effect on account of interactions with acid groups present in the base resin. On the other hand, too many carbons increases the molecular weight, which may keep a distinct flow-improving effect from appearing.

Specific examples of the fatty acid of component (c) include myristic acid, palmitic acid, stearic acid, 12-hydroxystearic acid, behenic acid, oleic acid, linoleic acid, linolenic acid, arachidic acid and lignoceric acid. Preferred use can be made of stearic acid, arachidic acid, behenic acid and lignoceric acid in particular.

The fatty acid derivative of component (c) is exemplified by metallic soaps in which the proton on the acid group of the fatty acid has been replaced with a metal ion.

Examples of the metal ion include $Na^+$, $Li^+$, $Ca^{++}$, $Mg^{++}$, $Zn^{++}$, $Mn^{++}$, $Al^{+++}$, $Ni^{++}$, $Fe^{++}$, $Fe^{+++}$, $Cu^{++}$, $Sn^{++}$, $Pb^{++}$ and $Co^{++}$. Of these, $Ca^{++}$, $Mg^{++}$ and $Zn^{++}$ are especially preferred.

Specific examples of fatty acid derivatives that may be used as component (c) include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

Use may also be made of known metallic soap-modified ionomers (see, for example, U.S. Pat. Nos. 5,312,857, 5,306,760 and International Disclosure WO 98/46671) when using above-described components (a) and/or (b), and component (c).

The amount of component (c) included per 100 parts by weight of the resin components when above components (a), (b) and (e) have been suitably blended, although not subject to any particular limitation, may be set to at least 5 parts by weight, preferably at least 10 parts by weight, more preferably at least 15 parts by weight, and even more preferably at least 20 parts by weight. Although there is no particular upper limit, the amount of component (c) included may be set to not more than 170 parts by weight, preferably not more than 150 parts by weight, more preferably not more than 130 parts by weight, and even more preferably not more than 110 parts by weight. If the amount of component (c) included is too small, the melt viscosity may decrease, lowering the processability. On the other hand, if the amount included is too large, the durability may decrease.

A basic inorganic metal compound capable of neutralizing acid groups in the base resin and in component (c) may be added as component (d). In cases where this component (d) is not included and a metal soap-modified ionomer resin (e.g., the metal soap-modified ionomer resins cited in the above-mentioned patent publications) is used alone, the metallic soap and un-neutralized acid groups present on the ionomer resin undergo exchange reactions during mixture under heating, generating a large amount of fatty acid. Because the fatty acid has a low thermal stability and readily vaporizes during molding, it may cause molding defects. Moreover, if the fatty acid deposits on the surface of the molded material, it may substantially lower paint film adhesion or have other undesirable effects such as lowering the resilience of the resulting molded material.

In the invention, by including above component (d), the acid groups within the base resin and component (c) are neutralized, making it possible to suppress the generation of fatty acids that cause trouble such as molding defects. By thus including component (d) and suppressing the generation of fatty acids, the material has a higher thermal stability and at the same time is imparted with a good moldability. Moreover, the resilience as a golf ball-forming material is enhanced.

Illustrative examples of the metal ions used in the basic inorganic metal compound include $Li^+$, $Na^+$, $K^+$, $Ca^{++}$, $Mg^{++}$, $Zn^{++}$, $Al^{+++}$, $Ni^{++}$, $Fe^{++}$, $Fe^{+++}$, $Cu^{++}$, $Mn^{++}$, $Sn^{++}$, $Pb^{++}$ and $Co^{++}$. Known basic inorganic fillers containing these metal ions may be used as the basic inorganic metal compound. Specific examples include magnesium oxide, magnesium hydroxide, magnesium carbonate, zinc oxide, sodium hydroxide, sodium carbonate, calcium oxide, calcium hydroxide, lithium hydroxide and lithium carbonate. In particular, a hydroxide or a monoxide is recommended. Calcium hydroxide and magnesium oxide, which have a high reactivity with the base resin, are more preferred. Calcium hydroxide is especially preferred.

The amount of component (d) included per 100 parts by weight of the resin component, although not subject to any particular limitation, may be set to at least 0.1 part by weight, preferably at least 0.5 part by weight, more preferably at least 1 part by weight, and even more preferably at least 2 parts by weight. The upper limit in the amount included may be set to not more than 17 parts by weight, preferably not more than 15 parts by weight, more preferably not more than 10 parts by weight, and even more preferably not more than 5 parts by weight. Too little component (d) fails to improve thermal stability and resilience, whereas too much instead lowers the heat resistance of the golf ball-forming material due to the presence of excess basic inorganic metal compound.

By blending specific respective amounts of components (c) and (d) with the resin component, i.e., the base resin containing specific respective amounts of components (a) and (b) in admixture with optional component (e), a material having excellent thermal stability, flow properties and moldability can be obtained, in addition to which the resilience of moldings obtained therefrom can be markedly improved.

It is recommended that the material formulated from specific amounts of the above-described resin component and components (c) and (d) have a high degree of neutralization (i.e., that the material be highly neutralized). Specifically, it is recommended that at least 50 mol %, preferably at least 60 mol %, more preferably at least 70 mol %, and even more preferably at least 80 mol %, of the acid groups in the material be neutralized. Highly neutralizing the acid groups in the material makes it possible to more reliably suppress the exchange reactions that cause trouble when only a base resin and a fatty acid or fatty acid derivative are used as in the above-cited prior art, thus preventing the generation of fatty acid. As a result, the thermal stability is substantially improved and the processability is good, making it possible to (1) un-neutralized acid group present on the ionomer resin
(2) metallic soap
(3) fatty acid
X: metal atom obtain molded products of outstanding resilience compared with conventional ionomer resins.

"Degree of neutralization," as used here, refers to the degree of neutralization of acid groups present within the mixture of the base resin and the fatty acid or fatty acid derivative serving as component (c), and differs from the degree of neutralization of the ionomer resin itself when an ionomer resin is used as the metal ion neutralization product of a random copolymer in the base resin. When a mixture of the invention having a certain degree of neutralization is compared with an ionomer resin alone having the same degree of neutralization, because the material of the invention contains a very large number of metal ions owing to the inclusion of component (d), the density of ionic crosslinks which contribute to improved resilience is increased, making it possible to confer the molded product with an excellent resilience.

To more reliably achieve both a high degree of neutralization and good flow properties, use may be made of a material in which the acid groups in the above-described mixture have been neutralized with transition metal ions and with alkali metal and/or alkaline earth metal ions. Although neutralization with transition metal ions results in a weaker ionic cohesion than neutralization with alkali metal and alkaline earth metal ions, by using these different types of ions together to neutralize acid groups in the mixture, a substantial improvement can be made in the flow properties.

It is recommended that the molar ratio between the transition metal ions and the alkali metal and/or alkaline earth metal ions be typically between 10:90 and 90:10, preferably between 20:80 and 80:20, more preferably between 30:70 and 70:30, and even more preferably between 40:60 and 60:40. Too low a molar ratio of transition metal ions may fail to provide a sufficient flow-improving effect. On the other hand, a transition metal ion molar ratio which is too high may lower the resilience.

Examples of the metal ions include, but are not limited to, zinc ions as the transition metal ions, and sodium ions, lithium ions and magnesium ions as the alkali metal ions or alkaline earth metal ions.

A known method may be used to obtain a mixture in which the desired amount of acid groups have been neutralized with transition metal ions and alkali metal or alkaline earth metal ions. Specific examples of methods of neutralization with transition metal ions, particularly zinc ions, include a method which uses a zinc soap as the fatty acid derivative, a method which uses a zinc ion neutralization product (e.g., a zinc ion-neutralized ionomer resin) when formulating components (a) and (b) as the base resin, and a method which uses a zinc compound such as zinc oxide as the basic inorganic metal compound of component (d).

The resin material preferably has a melt flow rate (MFR) adjusted within a specific range in order to ensure flow properties that are particularly suitable for injection molding, and thus improve moldability. In this case, it is recommended that the melt flow rate, as measured in general accordance with ASTM D1238 at a temperature of 190° C. and under a load of 21.18 N (2.16 kgf), be adjusted to preferably at least 0.5 g/10 min, more preferably at least 0.6 g/10 min, even more preferably at least 0.8 g/10 min, and most preferably at least 1 g/10 min. It is recommended that the upper limit be adjusted to preferably not more than 20 g/10 min, more preferably not more than 10 g/10 min, even more preferably not more than 5 g/10 min, and most preferably not more than 3 g/10 min. Too high or low a melt flow rate may result in a substantial decline in processability.

Commercial products may be used as the material containing the above components. Specific examples include those products having the trade names HPF 1000, HPF 2000, HPF AD1027, HPF AD1035 and HPF AD1040, as well as the experimental material HPF SEP1264-3, all produced by E.I. DuPont de Nemours & Co.

The core has a specific gravity which, although not subject to any particular limitation, may be set to less than 1.0, preferably not more than 0.98, and more preferably not more than 0.97. There is no particular lower limit, although the specific gravity is set to preferably at least 0.90, and more preferably at least 0.96. If the specific gravity is too large, the core resilience may become lower, as a result of which a good distance may not be achieved. On the other hand, if the specific gravity is too small, the resilience may become lower and the durability of the ball to repeated impact may worsen.

No particular limitation is imposed on the method of obtaining the solid core, although use may be made of a known method such as injection molding. The use of a method in which the core-forming material is injected into the cavity of a core mold is preferred.

Next, the envelope layer is described.

The envelope layer is a layer that covers the periphery of the core. In the present invention, it is critical for the thickness of the envelope layer to be set to from 3 to 10 mm. The lower limit in the thickness of the envelope layer may be set to preferably at least 4 mm, and more preferably at least 5 mm. The upper limit in the thickness may be set to preferably not more than 8 mm, and more preferably not more than 7 mm. If the envelope layer is too thin, the spin rate-lowering effect on full shots may be inadequate, as a result of which a good distance may not be achieved, and the durability to cracking on repeated impact may worsen. On the other hand, if the envelope layer is too thick, the spin rate-lowering effect on full shots may be inadequate, as a result of which a good distance may not be achieved, and the feel of the ball on full shots may become too hard.

The surface hardness of the envelope layer, although not subject to any particular limitation, may be set to a Shore D hardness value of preferably at least 40, more preferably at least 45, and even more preferably at least 50. There is no particular upper limit in the surface hardness of the envelope layer, although the Shore D hardness may be set to preferably not more than 80, more preferably not more than 70, and even more preferably not more than 60. If the surface hardness is too low, the ball rebound may become low and the spin rate-lowering effect on full shots may be inadequate, as a result of which a good distance may not be achieved. On the other hand, if the surface hardness is too high, the feel may become hard and the durability to cracking on repeated impact may worsen.

As used herein, "surface hardness" refers to the hardness measured at the surface of a sphere obtained by molding the material. Also, "Shore D hardness" refers to the hardness measured using a type D durometer in general accordance with ASTM D2240-95. The same applies below.

The envelope layer is formed using a rubber composition. In the present invention, although not subject to any particular limitation, particularly from the standpoint of obtaining a high rebound and an excellent flight performance, this layer is preferably formed using a rubber composition containing the subsequently described polybutadiene as the base rubber.

The polybutadiene is not subject to any particular limitation, although the use of a polybutadiene having on the polymer chain a cis-1,4 bond content of at least 60 wt %, preferably at least 80 wt %, more preferably at least 90 wt %, and most preferably at least 95 wt %, is recommended. If the cis-1,4 bond content among the bonds on the molecule is too small, the rebound may decrease.

The content of the 1,2-vinyl bonds included in the polybutadiene is not subject to any particular limitation, although it is recommended that the content on the polymer chain be preferably not more than 2 wt %, more preferably not more than 1.7 wt %, and even more preferably not more than 1.5 wt %. If the 1,2-vinyl bond content is too high, the rebound may decrease.

From the standpoint of obtaining a molded and vulcanized material having a good rebound, the polybutadiene is preferably one which has been synthesized using a rare earth catalyst or a Group VIII metal compound catalyst, and most preferably one which has been synthesized using a rare earth catalyst. Also, where necessary, an organoaluminum compound, an alumoxane, a halogen-bearing compound, a Lewis base and the like may be used in combination with these catalysts. In the present invention, it is preferable to use, as the various foregoing compounds, those mentioned in JP-A 11-35633.

In the invention, of the above rare earth catalysts, the use of a neodymium catalyst that employs a neodymium compound, which is a lanthanum series rare-earth compound, is especially recommended for obtaining a polybutadiene rubber having a high cis-1,4 bond content and a low 1,2-vinyl bond content at an excellent polymerization activity. Preferred examples of such rare-earth catalysts include those mentioned in JP-A 11-35633, JP-A 11-164912 and JP-A 2002-293996.

Illustrative examples of such lanthanide series rare-earth compounds include halides, carboxylates, alcoholates, thioalcoholates and amides of atomic number 57 to 71 metals.

Although not subject to any particular limitation, from the standpoint of enhancing rebound, it is recommended that the content of the above polybutadiene in the base rubber be preferably at least 10 wt %, more preferably at least 20 wt %, and even more preferably at least 40 wt %.

In the present invention, rubbers other than the above polybutadiene may also be included, insofar as the objects of the invention are attainable. Illustrative examples include polybutadiene rubbers other than the above-described polybutadiene, styrene-butadiene rubbers, natural rubbers, isoprene rubbers and ethylene-propylene-diene rubbers. These may be used singly or as a combination of two or more types.

In the invention, additives such as the subsequently described co-crosslinking agents, organic peroxides, antioxidants, inert fillers and organosulfur compounds may be suitably blended with the above base rubber.

Illustrative examples of co-crosslinking agents include unsaturated carboxylic acids and metal salts of unsaturated carboxylic acids.

Suitable unsaturated carboxylic acids include, but are not particularly limited to, acrylic acid, methacrylic acid, maleic acid and fumaric acid. The use of acrylic acid or methacrylic acid is especially preferred.

Suitable metal salts of unsaturated carboxylic acids include, but are not particularly limited to, the above unsaturated carboxylic acids neutralized with a desired metal ion. Specific examples include the zinc salts and magnesium salts of methacrylic acid and acrylic acid. The use of zinc acrylate is especially preferred.

The amount of the co-crosslinking agent included in the rubber composition per 100 parts by weight of the base rubber, although not subject to any particular limitation, may be set to preferably at least 5 parts by weight, more preferably at least 10 parts by weight, and even more preferably at least 15 parts by weight. There is no particular upper limit in the amount of the co-crosslinking agent per 100 parts by weight of the base rubber, although this amount may be set to preferably not more than 60 parts by weight, more preferably not more than 50 parts by weight, even more preferably not more than 45 parts by weight, and most preferably not more than 40 parts by weight. Too much co-crosslinking agent may make the ball too hard, resulting in an unpleasant feel at impact. On the other hand, too little co-crosslinking agent may lower the rebound.

Commercially available products may be used as the organic peroxide in the rubber composition. For example, preferred use may be made of Percumyl D, Perhexa C-40, Perhexa 3M (all produced by NOF Corporation) or Luperco 231XL (Atochem Co.). These may be used singly or as a combination of two or more thereof.

The amount of organic peroxide included in the rubber composition per 100 parts by weight of the base rubber, although not subject to any particular limitation, may be set to preferably at least 0.1 part by weight, more preferably at least 0.3 part by weight, even more preferably at least 0.5 part by weight, and most preferably at least 0.7 part by weight. There is no particular upper limit in the amount of organic peroxide per 100 parts by weight of the base rubber, although this amount may be set to preferably not more than 5 parts by weight, more preferably not more than 4 parts by weight, even more preferably not more than 3 parts by weight, and most preferably not more than 2 parts by weight. Too much or too little organic peroxide may make it impossible to obtain a good feel at impact, durability and rebound.

Commercially available products may be used as the antioxidant in the rubber composition. Illustrative examples include Nocrac NS-6 and Nocrac NS-30 (both available from Ouchi Shinko Chemical Industry Co., Ltd.), and Yoshinox 425 (Yoshitomi Pharmaceutical Industries, Ltd.). These may be used singly, or two or more may be used in combination.

The amount of antioxidant included in the rubber composition, although not subject to any particular limitation, can be set to more than 0, and may be set to preferably at least 0.05 part by weight, and more preferably at least 0.1 part by weight, per 100 parts by weight of the base rubber. There is no particular upper limit in the amount of antioxidant included, although this amount may be set to preferably not more than 3 parts by weight, more preferably not more than 2 parts by weight, even more preferably not more than 1 part by weight, and most preferably not more than 0.5 part by weight. Too much or too little antioxidant may make it impossible to obtain a good rebound and durability.

Preferred use may be made of inert fillers such as zinc oxide, barium sulfate and calcium carbonate in the rubber composition. These may be used singly, or two or more may be used in combination.

The amount of inert filler included in the rubber composition, although not subject to any particular limitation, may be set to preferably at least 1 part by weight, and more preferably at least 5 parts by weight, per 100 parts by weight of the base rubber. There is no particular upper limit in the amount of inert filler included per 100 parts by weight of the base rubber, although this amount may be set to preferably not more than 50 parts by weight, more preferably not more than 40 parts by weight, even more preferably not more than 30 parts by weight, and most preferably not more than 25 parts by weight. Too much or too little inorganic filler may make it impossible to achieve a suitable weight and a good rebound.

In addition, to enhance rebound by the golf ball, it is preferable for the rubber composition to include an organosulfur compound. The organosulfur compound is not subject to any particular limitation, provided it is capable of enhancing the golf ball rebound. Preferred use may be made of thiophenols, thionaphthols, halogenated thiophenols, and metal salts thereof. Specific examples include pentachlorothiophenol, pentafluorothiophenol, pentabromothiophenol, p-chlorothiophenol, the zinc salt of pentachlorothiophenol, the zinc salt of pentafluorothiophenol, the zinc salt of pentabromothiophenol, the zinc salt of p-chlorothiophenol, and diphenylpolysulfides, dibenzylpolysulfides, dibenzoylpolysulfides, dibenzothiazoylpolysulfides and dithiobenzoylpolysulfides having 2 to 4 sulfurs. In this invention, of the above, the use of diphenyldisulfide or the zinc salt of pentachlorothiophenol is especially preferred.

The amount of the organosulfur compound included per 100 parts by weight of the base rubber, although not subject to any particular limitation, may be set to preferably at least 0.05 part by weight, more preferably at least 0.1 part by weight, and even more preferably at least 0.2 part by weight. There is no upper limit in the amount of organosulfur compound included per 100 parts by weight of the base rubber, although this amount is preferably not more than 5 parts by weight, more preferably not more than 3 parts by weight, and even more preferably not more than 2.5 parts by weight. Including too little may make it impossible to obtain a sufficient rebound-enhancing effect. On the other hand, if too much is included, the rebound-enhancing effect (particularly on shots with a W#1) reaches a peak beyond which no further effect can be expected, in addition to which the core may become too soft, possibly worsening the feel of the ball at impact.

The specific gravity of the envelope layer, although not subject to any particular limitation, may be set to preferably not more than 1.5, more preferably not more than 1.35, and even more preferably not more than 1.25. There is no particular lower limit in the specific gravity, although the specific gravity may be set to preferably at least 1.0, more preferably at least 1.1, and even more preferably at least 1.2. If the specific gravity of the envelope layer falls outside of the above range, a good resilience may not be obtained, it may not be possible to obtain the desired hardness, as a result of which a good distance may not be achieved, and the durability to cracking under repeated impact may worsen.

The envelope layer forming method may be a known method and is not subject to any particular limitation, although preferred use may be made of the following method. First, an envelope layer-forming material is placed in a predetermined mold and subjected to primary vulcanization (semi-vulcanization) so as to produce a pair of hemispherical half-cups. Then, a prefabricated solid core is enclosed within the half-cups produced as just described, and secondary vulcanization (complete vulcanization) is carried out in this state. That is, advantageous use may be made of a process in which the vulcanization step is divided into two stages. Alternatively, advantageous use may be made of a process in which the envelope layer-forming material is injection-molded over the solid core.

Next, the intermediate layer is described.

The intermediate layer is a layer that covers the periphery of the envelope layer. In this invention, the thickness of the intermediate layer is not subject to any particular limitation, although it is recommended that the intermediate layer be formed so as to be thicker than the subsequently described cover. More specifically, it is recommended that the intermediate layer be set to a thickness of preferably at least 0.5 mm, more preferably at least 0.8 mm, and even more preferably at least 1.0 mm. There is no particular upper limit in the intermediate layer thickness, although the thickness may be set to preferably not more than 2.5 mm, more preferably not more than 2.0 mm, and even more preferably not more than 1.5 mm.

If the thickness of the intermediate layer is larger than the above range or smaller than the thickness of the subsequently described outer cover layer, the spin rate-lowering effect on full shots with a driver (W#1) may be inadequate, as a result of which a good distance may not be achieved. Also, if the thickness of the intermediate layer is too small, the durability of the ball to cracking on repeated impact and the low-temperature durability may worsen.

The surface hardness of the intermediate layer, although not subject to any particular limitation, may be set to a Shore D value of preferably at least 60, more preferably at least 64, and even more preferably at least 66. There is no particular upper limit in the surface hardness of the intermediate layer, although the Shore D hardness may be set to preferably not more than 80, more preferably not more than 76, and even more preferably not more than 73. The material hardness of the intermediate layer, although not subject to any particular limitation, may be set to a Shore D value of preferably at least 53, more preferably at least 58, and even more preferably at least 60. There is no particular upper limit in the material hardness, although the Shore D hardness may be set to preferably not more than 75, more preferably not more than 70, and even more preferably not more than 67. If the hardness of the intermediate layer is too low, the ball may be too receptive to spin on full shots, which may result in a poor distance. On the other hand, if the hardness is too high, the durability to cracking on repeated impact may worsen or the feel of the ball when hit with a putter or on short approach shots may become too hard.

As used herein, "material hardness" refers to the hardness measured for a sample obtained by molding a material into a sheet of a predetermined thickness, and "surface hardness" refers to the hardness measured at the surface of a sphere molded from the material. Also, "Shore D hardness" refers to the hardness measured using a type D durometer in general accordance with ASTM D2240-95. The same applies below.

The material which forms the intermediate layer is not subject to any particular limitation, although an ionomer resin is generally used for this purpose. Commercial products may be used as the ionomer resin. Illustrative examples include sodium-neutralized ionomer resins such as Himilan 1605, Himilan 1601 and AM7318 (all products of DuPont-Mitsui Polychemicals Co., Ltd.), and Surlyn 8120 (E.I. DuPont de Nemours & Co.); and zinc-neutralized ionomer resins such as Himilan 1557, Himilan 1706 and AM7318 (all products of DuPont-Mitsui Polychemicals Co., Ltd.). These may be used singly, or two or more may be used in combination.

These ionomer resins may be used singly or as combinations of two or more types. In the invention, from the standpoint of increasing the rebound of the ball, it is especially preferable to use a combination of a zinc-neutralized ionomer resin with a sodium-neutralized ionomer resin. In such a case, the compounding ratio by weight between the zinc-neutralized ionomer resin and the sodium-neutralized ionomer resin, although not subject to any particular limitation, may be set to generally between 25:75 and 75:25, preferably between 35:65 and 65:35, and more preferably between 45:55 and 55:45. At a compounding ratio outside the above range, the rebound may become too low, making it impossible to obtain the desired flight performance, the durability to cracking when repeatedly struck at ordinary temperatures may worsen, and the durability to cracking at low (subzero Celsius) temperatures may worsen.

In addition, various additives may optionally be included in the material for forming this intermediate layer. For example, additives such as pigments, dispersants, antioxidants, light stabilizers, ultraviolet absorbers and parting agents may be suitably included.

It is critical for the intermediate layer to have a specific gravity of less than 1.0. The range in the specific gravity may be set to preferably not more than 0.98, and more preferably not more than 0.96. The lower limit in the specific gravity may be set to preferably at least 0.90, and more preferably at least 0.94. At an intermediate layer specific gravity outside of the above range, the rebound becomes small, as a result of which a good distance is not obtained, and the durability to cracking under repeated impact worsens.

The method of forming the intermediate layer is not subject to any particular limitation, although a known method may be employed for this purpose. For example, use may be made of a method that involves injection-molding an intermediate layer-forming material over the envelope layer, or a method that involves prefabricating a pair of hemispherical half-cups from the intermediate layer-forming material, then enclosing an intermediate product (in this case, the sphere obtained by forming the envelope layer over the solid core) within these half-cups and molding under heat and pressure at 140 to 180° C. for 2 to 10 minutes.

Next, the cover is described. As used here in connection with the present invention, the term "cover" refers to the outermost layer of the ball and excludes the intermediate layer and envelope layer described above.

The surface hardness of the cover (that is, the surface hardness of the ball), although not subject to any particular limitation, may be set to a Shore D value of preferably at least 45, more preferably at least 50, and even more preferably at least 55. There is no particular upper limit in the surface hardness of the cover, although the Shore D hardness may be set to preferably not more than 70, more preferably not more than 65, and even more preferably not more than 60. The material hardness of the cover, although not subject to any particular limitation, may be set to a Shore D value of preferably at least 30, more preferably at least 40, and even more preferably at least 43. There is no particular upper limit in the material hardness, although the Shore D hardness may be set to preferably not more than 60, more preferably not more than 50, and even more preferably not more than 47. If the hardness of the cover is too low, the ball may be too receptive to spin on full shots, which may result in a poor distance. On the other hand, if the hardness is too high, the ball may not be receptive to spin on approach shots, as a result of which the controllability may be inadequate even for professional golfers and skilled amateur golfers.

The thickness of the cover is not subject to any particular limitation, although it is recommended that the cover thickness be set to preferably at least 0.3 mm, more preferably at least 0.5 mm, and even more preferably at least 0.7 mm. There is no particular upper limit in the cover thickness, although the thickness may be set to preferably not more than 1.5 mm, more preferably not more than 1.2 mm, and even more preferably not more than 1.0 mm. At a cover thickness larger than the above range, the ball rebound when struck with a driver (W#1) may be inadequate or the spin rate may be too high, as a result of which a good distance may not be obtained. On the other hand, if the cover thickness is smaller than the above range, the ball may have a poor scuff resistance or may have an inadequate controllability even for professional golfers and skilled amateur golfers.

From the standpoint of controllability and scuff resistance, the cover is formed using a resin composition composed primarily of urethane. Of such materials, in terms of amenability to mass production, the use of a thermoplastic polyurethane is especially preferred in this invention. More specifically, preferred use may be made of a material containing (A) a thermoplastic polyurethane and (B) an isocyanate compound.

To fully achieve the advantageous effects of the invention, a necessary and sufficient amount of unreacted isocyanate groups should be present within the cover resin material. Specifically, it is recommended that the combined weight of above component A and component B be preferably at least 60%, and more preferably at least 70%, of the overall weight of the cover layer. Above components A and B are described in detail below.

The thermoplastic polyurethane serving as component A has a structure which includes soft segments composed of a polymeric polyol that is a long-chain polyol (polymeric glycol), and hard segments composed of a chain extender and an isocyanate compound. Here, the long-chain polyol used as a starting material is not subject to any particular limitation, and may be any that is used in the prior art relating to thermoplastic polyurethanes. Exemplary long-chain polyols include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly or as combinations of two or more thereof. Of the long-chain polyols mentioned here, polyether polyols are preferred because they enable the synthesis of thermoplastic polyurethanes having a high rebound resilience and excellent low-temperature properties.

Illustrative examples of the above polyether polyol include poly(ethylene glycol), poly(propylene glycol), poly(tetramethylene glycol) and poly(methyltetramethylene glycol) obtained by the ring-opening polymerization of a cyclic ether. The polyether polyol may be used singly or as a combination of two or more thereof. Of these, preferred use may be made of poly(tetramethylene glycol) and poly(methyltetramethylene glycol).

It is preferable for these long-chain polyols to have a number-average molecular weight which, although not subject to any particular limitation, is in the range of 1,500 to 5,000. By using a long-chain polyol having a number-average molecular weight within this range, golf balls made of a thermoplastic polyurethane composition having excellent properties such as the above-described resilience and manufacturability can be reliably obtained. The number-average molecular weight of the long-chain polyol is more preferably in the range of 1,700 to 4,000, and even more preferably in the range of 1,900 to 3,000.

As used herein, "number-average molecular weight of the long-chain polyol" refers to the number-average molecular weight computed based on the hydroxyl number measured in accordance with JIS K-1557.

The chain extender used, although not subject to any particular limitation, is preferably one employed in the prior art relating to thermoplastic polyurethanes. For example, in the invention, use may be made of a low-molecular-weight compound which has a molecular weight of 400 or less and includes on the molecule two or more active hydrogen atoms capable of reacting with isocyanate groups. Of these, the use of an aliphatic diol having 2 to 12 carbons is preferred. Illustrative examples include 1,4-butylene glycol, 1,2-ethylene glycol, 1,3-butanediol, 1,6-hexanediol and 2,2-dimethyl-1,3-propanediol. Of these, the use of 1,4-butylene glycol is especially preferred.

The isocyanate compound is not subject to any particular limitation; preferred use may be made of one that is employed in the prior art relating to thermoplastic polyurethanes. Specific examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Depending on the type of isocyanate used, the crosslinking reaction during injection molding may be difficult to control. In the practice of the invention, to provide a balance between stability at the time of production and the properties that are manifested, it is most preferable to use 4,4'-diphenylmethane diisocyanate, which is an aromatic diisocyanate.

It is most preferable for the thermoplastic polyurethane serving as above component A to be a thermoplastic polyurethane synthesized using a polyether polyol as the long-chain polyol, using an aliphatic diol as the chain extender, and using an aromatic diisocyanate as the isocyanate compound. It is desirable, though not essential, for the polyether polyol to be a polytetramethylene glycol having a number-average molecular weight of at least 1,900, for the chain extender to be 1,4-butylene glycol, and for the aromatic diisocyanate to be 4,4'-diphenylmethane diisocyanate.

The ratio of active hydrogen atoms to isocyanate groups in the above polyurethane-forming reaction can be controlled within a desirable range so as to make it possible to obtain a golf ball which is composed of a thermoplastic polyurethane composition and has various improved properties, such as rebound, spin performance, scuff resistance and manufacturability. Specifically, in preparing a thermoplastic polyurethane by reacting the above long-chain polyol, isocyanate compound and chain extender, it is desirable to use the respective components in proportions such that the amount of isocyanate groups included on the isocyanate compound per mole of active hydrogen atoms on the long-chain polyol and the chain extender is between 0.95 and 1.05 moles.

No particular limitation is imposed on the method of preparing component A. Production may be carried out by a prepolymer process or a one-shot process which uses a long-chain polyol, a chain extender and an isocyanate compound, and employs a known urethane-forming reaction. Of these, a process in which melt polymerization is carried out in a substantially solvent-free state is preferred. Production by continuous melt polymerization using a multiple screw extruder is especially preferred.

A commercially available product may be used as component A. Illustrative examples include Pandex T-8295, Pandex T-8290, Pandex T-8283 and Pandex T-8260 (all available from DIC Bayer Polymer, Ltd.).

Next, it is critical that the isocyanate compound serving as component B have two or more isocyanate groups. Moreover, in this invention, a sufficient amount of unreacted isocyanate groups to fully achieve the advantageous effects of the invention should be present in the cover-forming resin material. That is, isocyanate compound in which all the isocyanate groups on the compound are in an unreacted state may be present together with isocyanate compound in which some or all of the isocyanate groups have reacted.

Various types of isocyanates may be employed without particular limitation as this isocyanate compound. Illustrative examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Of the above group of isocyanates, the use of 4,4'-diphenylmethane diisocyanate, dicyclohexylmethane diisocyanate and isophorone diisocyanate is preferable in terms of the balance between the influence on processability of such effects as the rise in viscosity that accompanies the reaction with the thermoplastic polyurethane serving as component A and the physical properties of the resulting golf ball cover material.

In the practice of the invention, although not an essential constituent, a thermoplastic elastomer other than the above-described thermoplastic polyurethane may be included as component C together with components A and B. Including this component C in the above resin blend makes it possible to further improve the flow properties of the resin blend and enables increases to be made in various properties required of golf ball cover materials, such as resilience and scuff resistance.

The compounding ratios of above components A to C are not subject to any particular limitation, although to fully achieve the advantageous effects of the invention, it is preferable for the weight ratio A:B:C of the respective components to be set to from 100:2:50 to 100:50:0.

In the practice of the invention, the resin blend is prepared by mixing together above component A, component B and also, if necessary, component C. It is preferable to select the mixing conditions such that, of the polyisocyanate compound, at least some polyisocyanate compound is present in which all the isocyanate groups on the molecule remain in an unreacted state. For example, it is preferable to furnish treatment such as purging with an inert gas (e.g., nitrogen) or vacuum treatment. The resin blend is then injection-molded over an intermediate product (in this case, a sphere obtained by forming the envelope layer and the intermediate layer over the solid core) which has been placed in a mold. For smooth and easy handling, it is preferable for the resin blend to be formed into pellets having a length of 1 to 10 mm and a diameter of 0.5 to 5 mm. Isocyanate groups in an unreacted state remain in these resin pellets; the unreacted isocyanate groups react with component A or component C to form a crosslinked material, either while the resin blend is being injection-molded over the intermediate product or due to post-treatment thereafter, such as annealing.

Various additives such as pigments, dispersants, antioxidants, ultraviolet absorbers, ultraviolet stabilizers, parting agents, plasticizers, and inorganic fillers (e.g., zinc oxide, barium sulfate, titanium dioxide) may be optionally included in the above-described resin composition, i.e., the cover-forming material.

The melt flow rate (MFR) of the above cover-forming material at 210° C. is not subject to any particular limitation. However, to increase the flow properties and manufacturability, the MFR is preferably at least 5 g/10 min, more preferably at least 20 g/10 min, and even more preferably at least 50 g/10 min. If the melt flow rate of the material is too small, the flow properties will decrease, which may cause eccentricity during injection molding and may also lower the degree of freedom of design in the cover thickness. The melt flow rate is measured in accordance with JIS K 7210-1999.

An example of a method which may be employed to mold the cover involves feeding the above cover-forming material to an injection molding machine, and injecting the molten material over the intermediate layer. Although the molding temperature in this case will vary depending on the type of thermoplastic polyurethane, the molding temperature is generally in the range of 150 to 250° C.

When injection molding is carried out, it is desirable, though not essential, to render the interior of the resin paths from the resin feed area to the mold interior into a low-humidity environment by subjecting some or all places on these resin paths to purging with an inert gas such as nitrogen or a low-moisture gas such as low dew-point dry air, or to vacuum treatment. Preferred, non-limiting, examples of the medium used for transporting the resin under applied pressure include inert gases such as nitrogen and low-humidity gases such as low dew-point dry air. By molding the cover in such a low-humidity environment, reaction by the isocyanate groups is suppressed as much as possible in the period up until the resin blend is charged into the mold interior. As a result, the resin blend has a stable viscosity and an improved moldability, in addition to which the real crosslinking efficiency can be enhanced.

By forming the cover in the above manner, a distance-increasing effect is obtained, in addition to which the spin performance on approach shots improves, enabling both controllability and distance to be achieved.

When forming the above cover, although not subject to any particular limitation, to increase adhesion with the intermediate layer, it is desirable to first subject the surface of the intermediate layer (that is, the sphere after formation of the intermediate layer) to abrasion treatment. In addition, it is preferable to apply a primer (adhesive) to the surface of the intermediate layer following abrasion treatment or to add an adhesion reinforcing agent to the cover-forming material. Examples of adhesion reinforcing agents that may be included in this material include organic compounds such as 1,3-butanediol and trimethylolpropane, and oligomers such as polyethylene glycol and polyhydroxy polyolefin oligomers. The use of trimethylolpropane or a polyhydroxy polyolefin oligomer is especially preferred. Examples of commercial products include trimethylolpropane available from Mitsubishi Gas Chemical Co., Ltd. and polyhydroxy polyolefin oligomers available from Mitsubishi Chemical Corporation (under the trade name "Polytail H"; number of main-chain carbons, 150 to 200; hydroxy-terminated).

Up until this point, details on the respective layers, that is, the solid core, envelope layer, intermediate layer and cover, have been described separately for each cover. Next, the relationships among these layers are described.

It is essential for the specific gravities of the above core, envelope layer and intermediate layer to satisfy the following relationship:

core specific gravity<envelope layer specific gravity>intermediate layer specific gravity.

By having the specific gravities of the respective above layers satisfy this relationship, a good ball rebound can be ensured. If the specific gravities of the core and the intermediate layer are too high, the rebound may under a large decrease.

It is essential for the Shore D surface hardnesses of the core, the envelope layer, the intermediate layer and the cover to satisfy the following relationship:

core surface hardness<envelope layer surface hardness<intermediate layer surface hardness>cover surface hardness.

In this invention, by giving the intermediate layer a high surface hardness, the spin rate on full shots is suppressed; by giving the core a lower surface hardness than the intermediate layer, a good feel at impact that is not too hard is obtained on full shots; and by having the surface hardness of the envelope layer be a hardness intermediate between those of the intermediate layer and the solid core, a good rebound and a suitable feel at impact are imparted. In addition, by making the surface hardness of the cover (i.e., of the ball) softer than the surface hardness of the intermediate layer, a high controllability in the short game is conferred.

Moreover, the surface hardnesses of the respective layers preferably satisfy the following conditions.

The difference between the surface hardness of the envelope layer and the surface hardness of the core (i.e., the value of (envelope layer surface hardness−core surface hardness)), although not subject to any particular limitation, may be set to a Shore D hardness value of preferably at least 1, more preferably at least 2, and even more preferably at least 3. There is no particular upper limit, although the Shore D hardness value of this difference may be set to preferably not more than 10, more preferably not more than 8, and even more preferably not more than 5. If this hardness difference is too large, the durability to cracking under repeated impact may worsen. On the other hand, if the hardness difference is too small, and, in particular, if the surface hardness of the envelope layer is smaller than the surface hardness of the solid core, the spin rate on full shots may become too high, as a result of which a good distance may be not achieved.

The difference between the surface hardness of the intermediate layer and the surface hardness of the envelope layer (i.e., the value of (intermediate layer surface hardness −envelope layer surface hardness)), although not subject to any particular limitation, may be set to a Shore D hardness value of preferably at least 5, more preferably at least 10, and even more preferably at least 12. There is no particular upper limit, although the Shore D hardness value of this difference may be set to preferably not more than 25, more preferably not more than 20, and even more preferably not more than 18. If this hardness difference is too large, the durability to cracking under repeated impact may worsen. On the other hand, if the hardness difference is too small, the spin rate on full shots may become too high, as a result of which a good distance may be not achieved.

The difference between the surface hardness of the cover (i.e., of the ball) and the surface hardness of the intermediate layer (i.e., the value of (core surface hardness−intermediate layer surface hardness)), although not subject to any particular limitation, may be set to a Shore D hardness value of preferably at least −25, more preferably at least −20, and even more preferably at least −15. There is no particular upper limit, although the Shore D hardness value of this difference may be set to preferably not more than −1, more preferably not more than −5, and even more preferably not more than −10. If this hardness difference is too large (if the above value is too large in the negative direction), the durability to cracking under repeated impact may worsen. On the other hand, if the hardness difference is too small, the spin rate in the short game may be too small.

In the golf ball of the invention, as in conventional golf balls, numerous dimples may be formed on the surface of the cover in order to further increase the aerodynamic properties and extend the distance traveled by the ball. In such cases, the number of dimples formed on the ball surface, although not subject to any particular limitation, is preferably at least 280, more preferably at least 300, and even more preferably at least 320. The maximum number of dimples, although not subject to any particular limitation, may be set to preferably not more than 360, more preferably not more than 350, and even more preferably not more than 340. If the number of dimples is larger than the above range, the trajectory of the ball may become low, as a result of which a good distance may not be achieved. On the other hand, if the number of dimples is smaller than the above range, the trajectory may become high, as a result of which an increased distance may not be achieved.

The geometric arrangement of the dimples on the ball may be, for example, octahedral or icosahedral. In addition, the dimple shapes may be of one, two or more types suitably selected from among not only circular shapes, but also various polygonal shapes, such as square, hexagonal, pentagonal and triangular shapes, as well as dewdrop shapes and oval shapes. The dimple diameter (in polygonal shapes, the lengths of the diagonals), although not subject to any particular limitation, is preferably set to from 2.5 to 6.5 mm. In addition, the dimple depth, although not subject to any particular limitation, is preferably set to from 0.08 to 0.30 mm.

In this invention, the value $V_0$, defined as the spatial volume of a dimple below the flat plane circumscribed by the dimple edge, divided by the volume of the cylinder whose base is the flat plane and whose height is the maximum depth of the dimple from the base, although not subject to any particular limitation, may be set to from 0.35 to 0.80.

From the standpoint of reducing aerodynamic resistance, the ratio SR of the sum of individual dimple surface areas, each defined by the flat plane circumscribed by the edge of a dimple, with respect to the surface area of the ball sphere were the ball surface to have no dimples thereon, although not subject to any particular limitation, is preferably set to from 60 to 90%. This ratio SR can be elevated by increasing the number of dimples formed, and also by intermingling dimples of a plurality of types of differing diameters or by giving the dimples shapes such that the distances between neighboring dimples (i.e., the widths of the lands) become substantially 0.

The ratio VR of the sum of the spatial volumes of individual dimples, each formed below the flat plane circumscribed by the edge of a dimple, with respect to the volume of the ball sphere were the ball surface to have no dimples thereon, although not subject to any particular limitation, is preferably set to from 0.6 to 1% in this invention.

In this invention, by setting the above $V_0$, SR and VR values in the foregoing ranges, the aerodynamic resistance is reduced, in addition to which a trajectory enabling a good distance to be achieved is readily obtained, making it possible to improve the flight performance.

The diameter of the golf ball obtained by forming the respective above-described layers has a diameter which should conform to the standards for golf balls, and is preferably not less than 42.67 mm. There is no particular upper limit in the golf ball diameter, although the diameter may be set to preferably not more than 44 mm, more preferably not more than 43.8 mm, even more preferably not more than 43.5 mm, and most preferably not more than 43 mm. The weight of the golf ball also not subject to any particular limitation, although for similar reasons is preferably set in the range of 45.0 to 45.93 g.

Also, in this invention, the surface of the ball cover may be subjected to various types of treatment, such as surface preparation, stamping and painting, in order to enhance the design and durability of the golf ball.

As explained above, the present invention provides a multi-piece solid golf ball which can achieve an increased distance on full shots with a driver (W#1) and enhance controllability in the short game, and which moreover is able to confer an agreeable feel at impact on full shots.

EXAMPLES

Examples of the invention and Comparative Examples are given below by way of illustration, and not by way of limitation.

Examples 1 and 2

First, a solid core was fabricated by injecting HPF 2000 (E.I. DuPont de Nemours & Co.) into a core mold.

Next, the rubber compositions formulated as shown in Table 1 were prepared using a roll mill, then subjected to 3 minutes of primary vulcanization (semi-vulcanization) at 35° C., thereby producing a pair of hemispherical half-cups. Next, the solid core was enclosed within the half-cups and subjected to 15 minutes of secondary vulcanization (complete vulcanization) at 155° C. in a mold, thereby forming an envelope layer.

TABLE 1

| Formulation (parts by weight) | A |
|---|---|
| Polybutadiene rubber | 100 |
| Zinc acrylate | 35.0 |
| Organic peroxide | 1.2 |
| Antioxidant | 0.1 |
| Zinc oxide | 13.4 |
| Zinc salt of pentachlorothiophenol | 2.0 |
| Zinc stearate | 5.0 |

Details on the materials in Table 1 are given below.

Polybutadiene rubber: Available as "BR730" from JSR Corporation. A polybutadiene rubber obtained using a neodymium catalyst; cis-1,4 bond content, 96 wt %; Mooney viscosity, 55; molecular weight distribution, 3.

Zinc acrylate: Available from Nihon Jyoryu Kogyo Co., Ltd.

Organic peroxide: Available as "Perhexa C-40" from NOF Corporation. 1,1-Bis(t-butylperoxy)-cyclohexane diluted to 40% with an inorganic filler. Half-life at 155° C., about 50 seconds.

Antioxidant: Available as "Nocrac NS-6" from Ouchi Shinko Chemical Industry Co., Ltd.

Zinc oxide: Available from Sakai Chemical Co., Ltd.

Figure 2:
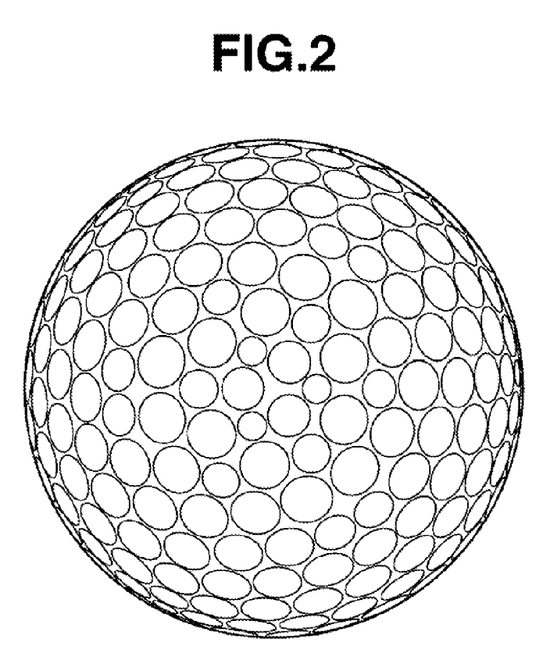
FIG. 2 is a top view showing the arrangement of dimples formed on the surface of the balls in the examples.

In addition, an intermediate layer was formed by injection-molding the resin materials (Nos. 1 and 2) formulated as shown in Table 2 over the envelope layer formed as described above. Next, the starting materials shown under No. 3 in Table 2 (units are in parts by weight) were mixed under a nitrogen atmosphere in a twin-screw extruder, thereby obtaining a cover-forming resin material. This resin material was in the form of pellets having a length of 3 mm and a diameter of 1 to 2 mm. A cover was formed by injection-molding the pelletized resin material (No. 3) over the intermediate layer formed as described above, thereby giving a multi-piece solid golf ball with a four-layer construction composed of a solid core that is enclosed by, in turn, an envelope layer, an intermediate layer and a cover. Dimples having the configuration shown in FIG. 2 were formed at this time on the surface of the cover on the balls obtained in each example. Details on the dimples are shown in Table 3. Details on the balls that were fabricated are shown in Table 4.

TABLE 2

| Formulation (pbw) | No. 1 | No. 2 | No. 3 |
|---|---|---|---|
| AM7317 | | 50 | |
| AM7318 | | 50 | |
| Himilan 1605 | 50 | | |
| Himilan 1706 | 35 | | |
| Himilan 1557 | 15 | | |
| Trimethylolpropane | 1.1 | 1.1 | |
| Pandex T-8290 | | | 37.5 |
| Pandex T-8283 | | | 62.5 |
| Titanium oxide | | | 3.5 |
| Polyethylene wax | | | 1.5 |
| Isocyanate compound | | | 9 |

Details on the materials in Table 2 are given below.
AM7317, AM7318: High-stiffness ionomers available from DuPont-Mitsui Polychemicals Co., Ltd.
Himilan 1605, 1706, 1557:
  Ionomer resins available from DuPont-Mitsui Polychemicals Co., Ltd.
Pandex T-8290, T-8283:
  MDI-PTMG type thermoplastic polyurethanes available from DIC Bayer Polymer.
Titanium oxide: Available as "Tipaque R680" from Ishihara Sangyo Kaisha, Ltd.
Polyethylene wax: Available under the trade name "Sanwax 161P" from Sanyo Chemical Industries, Ltd.
Isocyanate compound: 4,4'-Diphenylmethane diisocyanate.

TABLE 3

| No. | Number of dimples | Diameter (mm) | Depth (mm) | $V_0$ | SR (%) | VR (%) |
|---|---|---|---|---|---|---|
| 1 | 12 | 4.6 | 0.15 | 0.47 | 81 | 0.78 |
| 2 | 234 | 4.4 | 0.15 | 0.47 | | |
| 3 | 60 | 3.8 | 0.14 | 0.47 | | |
| 4 | 6 | 3.5 | 0.13 | 0.46 | | |
| 5 | 6 | 3.4 | 0.13 | 0.46 | | |
| 6 | 12 | 2.6 | 0.10 | 0.46 | | |
| Total | 330 | | | | | |

Dimple Definitions
Diameter: Diameter of flat plane circumscribed by edge of dimple.
Depth: Maximum depth of dimple from flat plane circumscribed by edge of dimple.
$V_0$: Spatial volume of dimple below flat plane circumscribed by dimple edge, divided by volume of cylinder whose base is the flat plane and whose height is the maximum depth of dimple from the base.
SR: Sum of individual dimple surface areas, each defined by the flat plane circumscribed by the edge of the dimple, as a percentage of the surface area of a hypothetical sphere were the ball to have no dimples on the surface thereof.
VR: Sum of spatial volumes of individual dimples formed below flat plane circumscribed by the edge of the dimple, as a percentage of the volume of a hypothetical sphere were the ball to have no dimples on the surface thereof.

The following properties were investigated for the golf balls obtained. Also, flight tests were carried out by the following methods, in addition to which the feel at impact was evaluated. The results are shown in Table 4.

(1) Core Deflection (mm)

The core was placed on a hard plate, and the amount of deformation by the core when compressed under a final load of 1,275 N (130 kgf) from an initial load state of 98 N (10 kgf) was measured.

The above deflections are all measured values obtained after first holding the core isothermally at 23° C.

(2) Center Hardness of Core (Shore D Hardness)

The core was cut in half (through the center) and measurement was carried out by perpendicularly pressing the indenter of a type D durometer, as stipulated in ASTM D2240-95, against the center of the cross-section.

The above hardness is a measured value obtained after holding the core isothermally at 23° C. The results obtained by converting this center hardness into a JIS-C hardness value (in accordance with JIS K 6301) are also shown in Table 4.

(3) Surface Hardnesses (Shore D Hardnesses) of Core, Envelope Layer, Intermediate Layer and Cover Measurement was carried out by perpendicularly pressing the indenter of a type D durometer, as stipulated in ASTM D2240-95, against the surface of the intermediate product at the stage where the layer to be measured has been formed or against the surface of the ball. The surface hardness of the ball (i.e., the cover) is the value measured at a land area where a dimple is not formed on the ball surface.

The above hardnesses are all measured values obtained after holding the intermediate product or the ball isothermally at 23° C. The results obtained by converting these surface hardnesses into JIS-C hardness values (in accordance with JIS K 6301) are also shown in Table 4.

(4) Material Hardness of Intermediate Layer (Shore D Hardness)

The intermediate layer-forming material was molded into sheets having a thickness of about 2 mm and held for two weeks at 23° C., following which the sheets were stacked to a thickness of at least 6 mm, and the hardness was measured with a type D durometer in accordance with ASTM D2240-95. The results obtained by converting this material hardness into a JIS-C hardness value (in accordance with JIS K 6301) are also shown in Table 4.

(5) Material Hardness of Cover (Shore D Hardness)

A 2 mm thick sheet obtained by injection molding the cover-forming material was annealed at 100° C. for 8 hours and left to stand for one week at room temperature, following which the hardness was measured with a type D durometer in accordance with ASTM D2240-95. The results obtained by converting this material hardness into a JIS-C hardness value (in accordance with JIS K 6301) are also shown in Table 4.

(6) Flight Performance

A driver (W#1) was mounted on a golf swing robot, and the spin rate, carry and total distance when the ball was struck at a head speed (HS) of 45 m/s was measured. The club used was a TourStage X-Drive 705, TYPE 415 driver (2011 model; loft, 9.5°) manufactured by Bridgestone Sports Co., Ltd.

(7) Spin Rate on Approach Shots

A sand wedge (SW) was mounted on a golf swing robot, and the spin rate when the ball was struck at a head speed (HS) of 20 m/s was measured. The club used was a TourStage X-WEDGE (loft, 56°) manufactured by Bridgestone Sports Co., Ltd.

(8) Feel

The feel of the ball when hit with a driver (W#1) was rated by ten skilled amateur golfers having head speeds (HS) of 43 to 50 m/s. The rating criteria were as follows.

Good: The ball had a crisp, solid feel at impact
  NG: The feel at impact was soft and lacked crispness

TABLE 4

|  |  | Example 1 | Example 2 |
|---|---|---|---|
| Core | Material | HPF 2000 | HPF 2000 |
|  | Diameter (mm) | 25.0 | 25.0 |
|  | Weight (g) | 8.2 | 8.2 |
|  | Specific gravity | 0.96 | 0.96 |
|  | Deflection (mm) | 3.3 | 3.3 |
|  | Surface hardness (JIS-C) | 79 | 79 |
|  | Surface hardness (Shore D) | 52 | 52 |
|  | Center hardness (JIS-C) | 71 | 71 |
|  | Center hardness (Shore D) | 46 | 46 |
|  | Surface hardness − center hardness (JIS-C) | 8 | 8 |
|  | Surface hardness − center hardness (Shore D) | 6 | 6 |
| Envelope layer | Material | A | A |
|  | Thickness (mm) | 6.5 | 6.5 |
|  | Specific gravity | 1.22 | 1.22 |
|  | Surface hardness (JIS-C) | 84 | 84 |
|  | Surface hardness (Shore D) | 56 | 56 |
| Envelope layer-covered sphere | Diameter (mm) | 38.0 | 38.0 |
|  | Weight (g) | 33.3 | 33.3 |
| Intermediate layer | Material | No. 1 | No. 2 |
|  | Thickness (mm) | 1.5 | 1.5 |
|  | Specific gravity | 0.96 | 0.96 |
|  | Surface hardness (JIS-C) | 100 | 100 |
|  | Surface hardness (Shore D) | 68 | 72 |
|  | Material hardness (JIS-C) | 92 | 97 |
|  | Material hardness (Shore D) | 62 | 66 |
| Intermediate layer-covered sphere | Diameter (mm) | 41.1 | 41.1 |
|  | Weight (g) | 40.6 | 40.6 |
| Cover | Material | No. 3 | No. 3 |
|  | Thickness (mm) | 0.8 | 0.8 |
|  | Specific gravity | 1.12 | 1.12 |
|  | Surface hardness (JIS-C) | 87 | 88 |
|  | Surface hardness (Shore D) | 58 | 59 |
|  | Material hardness (JIS-C) | 68 | 68 |
|  | Material hardness (Shore D) | 44 | 44 |
| Ball | Diameter (mm) | 42.7 | 42.7 |
|  | Weight (g) | 45.5 | 45.5 |
| Envelope layer surface hardness − core surface hardness (Shore D) |  | 4 | 4 |
| Intermediate layer surface hardness − envelope layer surface hardness (Shore D) |  | 12 | 16 |
| Cover surface hardness − intermediate layer surface hardness (Shore D) |  | −10 | −13 |
| Performance evaluation | Flight performance (W#1) Spin rate (rpm) | 3125 | 3055 |
|  | Carry (m) | 211.6 | 212.1 |
|  | Total distance (m) | 227.0 | 228.1 |
| Spin rate on approach shots | Spin rate (rpm) | 6155 | 6110 |
| Feel at impact |  | good | good |

The invention claimed is:

1. A multi-piece solid golf ball comprising a core, an envelope layer encasing the core, an intermediate layer encasing the envelope layer, and a cover which encases the intermediate layer and has formed on a surface thereof a plurality of dimples, wherein the core is formed primarily of a thermoplastic resin and has a diameter of from 20 to 30 mm, the envelope layer is formed of a rubber composition containing primarily a rubber material and has a thickness of from 3 to 10 mm, the intermediate layer is formed of a resin composition containing primarily an ionomer, and the cover is formed of a resin composition containing primarily a urethane; wherein the intermediate layer has a specific gravity of less than 1.0, and the core, the envelope layer and the intermediate layer have specific gravities which satisfy the condition:

core specific gravity<envelope layer specific gravity>intermediate layer specific gravity;

and wherein the core, the envelope layer, the intermediate layer and the cover have Shore D surface hardnesses which satisfy the condition:

core surface hardness<envelope layer surface hardness<intermediate layer surface hardness>cover surface hardness.

2. The multi-piece solid golf ball of claim 1, wherein the core diameter is from 22 to 28 mm.

3. The multi-piece solid golf ball of claim 1, wherein the envelope layer thickness is from 4 to 8 mm.

4. The multi-piece solid golf ball of claim 1, wherein the core, the envelope layer, the intermediate layer and the cover have Shore D surface hardnesses which satisfy the conditions:

1≤envelope layer surface hardness−core surface hardness≤10

5≤intermediate layer surface hardness−envelope layer surface hardness≤25

−25≤ball surface hardness−intermediate layer surface hardness≤−1.

5. The multi-piece solid golf ball of claim 1, wherein the core has a specific gravity of less than 1.0.

* * * * *